(12) United States Patent
Zou

(10) Patent No.: US 6,626,615 B2
(45) Date of Patent: Sep. 30, 2003

(54) CHUCK FOR CHUCKING A SMALL BIT AND TABLE DRILL WITH THE SAME

(75) Inventor: Dejun Zou, 18C-29 Building, Meilin Yicun, Shenzhen City, Guangdong Province 518049 (CN)

(73) Assignees: Dejun Zou, Shemzen (CN); Guang He, Shemzen (CN)

( * ) Notice: Subject to any disclaimer, the term of this patent is extended or adjusted under 35 U.S.C. 154(b) by 69 days.

(21) Appl. No.: 09/834,671

(22) Filed: Apr. 13, 2001

(65) Prior Publication Data

US 2001/0033778 A1 Oct. 25, 2001

(30) Foreign Application Priority Data

Apr. 21, 2000  (CN) .......................... 00105950 A

(51) Int. Cl.[7] .......................... B23B 31/10; B23B 45/14
(52) U.S. Cl. ...................... 408/111; 408/240; 408/135; 408/136; 279/64; 279/69
(58) Field of Search ................. 408/111, 135, 408/136, 130; 279/56, 59, 58, 60, 61, 62, 64, 69

(56) References Cited

U.S. PATENT DOCUMENTS

| | | | | |
|---|---|---|---|---|
| 1,311,947 A | * | 8/1919 | Chamberlin | 408/135 |
| 1,487,690 A | * | 3/1924 | Marti | 408/135 |
| 1,927,981 A | * | 9/1933 | Hassner | 279/61 |
| 2,625,844 A | * | 1/1953 | Beckett et al. | 408/135 |
| 3,374,695 A | * | 3/1968 | Lehberger | 408/135 |
| 5,062,743 A | * | 11/1991 | Wieland et al. | 408/135 |
| 5,517,746 A | * | 5/1996 | Cox et al. | 408/124 |

FOREIGN PATENT DOCUMENTS

| | | | | |
|---|---|---|---|---|
| FR | 451416 | * | 2/1913 | 279/64 |
| GB | 12465 | * | 5/1913 | 279/69 |

* cited by examiner

*Primary Examiner*—Daniel W. Howell
(74) *Attorney, Agent, or Firm*—Workman Nydegger

(57) ABSTRACT

A chuck for holding a small bit and used with a table drill is provided for drilling a millipore. The chuck includes a holding jaw having four holders; a jaw-positioning guiding body with a square hole at the front portion for positioning the holding jaw; a crossing linkage for connecting the body to the jaw and having a crossing head and a projection portion between which a groove is formed; a guiding jacket matched with the crossing linkage and the body; a positioning screw nut matched with the jaw-position guiding body; a screw collar matched with the crossing linkage; and a bevel gear housing housed around the screw collar for adjusting the position of the holding jaw.

11 Claims, 5 Drawing Sheets

US 6,626,615 B2

CHUCK FOR CHUCKING A SMALL BIT AND TABLE DRILL WITH THE SAME

FIELD OF THE INVENTION

The present invention relates to a chuck and apparatus equipped with the same used in mechanical process, in particular, to a chuck and a table drill with the same for drilling a Millipore.

BACKGROUND OF THE INVENTION

Conventional cutters used in a drilling machine, a turning machine, a milling machine, a boring machine and a digitally controlled machine have three jaws. Those table drills specialized in drilling usually adopt the conventional three-jaw cutters to perform conventional process. The operator can directly control the depth and length of drilling by using the handle. The stronger the force is applied to the handle, the stronger the pressure is applied to a workpiece to be processed. The above operation is effective for the conventional process. However, when the process needs higher precision such as drilling a pore having a diameter less than 0.2 mm, the conventional operation cannot be performed correctly.

The reasons are as follows: (1) The conventional three-jaw chuck cannot hold a small bit. Even if the bit is held, it is hard to ensure the bit in a correct position. Once a bit is in a position deviated from the center, the bit will be broken when it rotates in high speed. (2) Since the feed of a cutter is manually operated by an operator, it is hard to actually control the feed and the depth of the cutter. In fact, people have more or less such an experience that when a bit contacts the workpiece, the bit will be broken once a force is applied thereto. Thus, it is difficult to drill a millipore with a diameter equal to or less than 0.2 mm for workpieces used in the field of machining, electronic engineering, automobile manufacturing, clock/watch production, laser device, computer and aerospace.

SUMMARY OF THE INVENTION

An object of the invention is to provide a flexible and reliable chuck, which comprises:
  a holding jaw comprising four holders;
  a jaw-position guiding body with a square hole at the front portion for positioning the holding jaw;
  a crossing linkage for connecting the jaw-position guiding body to the jaw, comprising a crossing head and a projection portion between which a groove is formed;
  a guiding jacket operably positioned with respect to both the crossing linkage and the jaw-position guiding body;
  a positioning screw nut threadably engaged with the jaw-position guiding body;
  a screw collar threadably engaged with the crossing linkage; and a bevel gear housing fixedly attached about the screw collar.

Another object of the present invention is to provide a table drill for drilling a millipore, which comprises:
  a base;
  a column standing on the base; and
  a composite body arranged on the column, comprising a motor, a chuck for chucking a small twist dill, a drilling spindle, and controlling means for controlling the drilling spindle to move upwards and downwards and automatically adjusting the pressure applied to the bit, wherein said controlling means comprises:
  a gearbox jacketing a horizontal axis of said controlling means, at one end of which a first block is formed;
  a linkage box comprising a second block at one end corresponding to the first block of the gearbox;
  a handle disposed on the other end of the linkage box; and
  a spring positioned between the first block and the second block.

DETAILED DESCRIPTION OF THE PREFERRED EMBODIMENTS

A chuck for chucking a small bit according to the invention comprises:
  a holding jaw comprising four holders;
  a jaw-position guiding body with a square hole at the front portion for positioning the holding jaw;
  a crossing linkage for connecting the jaw-position guiding body to the jaw, comprising a crossing head and a projection portion between which a groove is formed;
  a guiding jacket operably positioned with respect to both the crossing linkage and the jaw-position guiding body;
  a positioning screw nut threadably engaged with the jaw-position guiding body;
  a screw collar threadably engaged with the crossing linkage; and a bevel gear housing fixedly attached about the screw collar.

Each of said holder comprises three faces that are arranged to define a triangular cross sectional shape, and wherein one face of each holder defines a raised guiding track, and wherein the other two faces of each holder together define a notch.

In the invention, a guiding groove is formed on an inner wall of the square hole of the jaw-position guiding body, and wherein an outer screw thread is formed on the outer surface at the rear portion of the jaw-position guiding body, and wherein four first axial guiding areas are formed at the rear portion of the jaw-position guiding body.

Said crossing linkage further comprises four extended portions, each of the four extended portions being received into one of said four first axial guiding areas formed in the jaw-position guiding body.

Said guiding jacket defines four second axial guiding areas, the guiding jacket being positioned within the jaw-position guiding body such that each second axial guiding area is aligned with one of the four first axial guiding areas, wherein one of the four extended portions of the crossing linkage is received into each of the second axial guiding areas, and wherein said guiding jacket further defines four guiding grooves on inner walls of the guiding jacket.

Said notch of each holder is engaged with said projection portion of the crossing linkage.

The invention also provides a table drill for drilling a millipore, which comprises:

a base;

a column standing on the base; and a composite body arranged on the column, comprising a motor, a chuck for chucking a small twist dill, a drilling spindle, and controlling means for controlling the drilling spindle to move upwards and downwards and automatically adjusting the pressure applied to the bit, wherein said controlling means comprises:

a gearbox jacketing a horizontal axis of said controlling means, at one end of which a first block is formed;

a linkage box comprising a second block at one end corresponding to the first block of the gearbox;

a handle disposed on the other end of the linkage box; and a spring positioned between the first block and the second block.

The present invention will now be described in detail in combination with the drawings.

Figure 1:
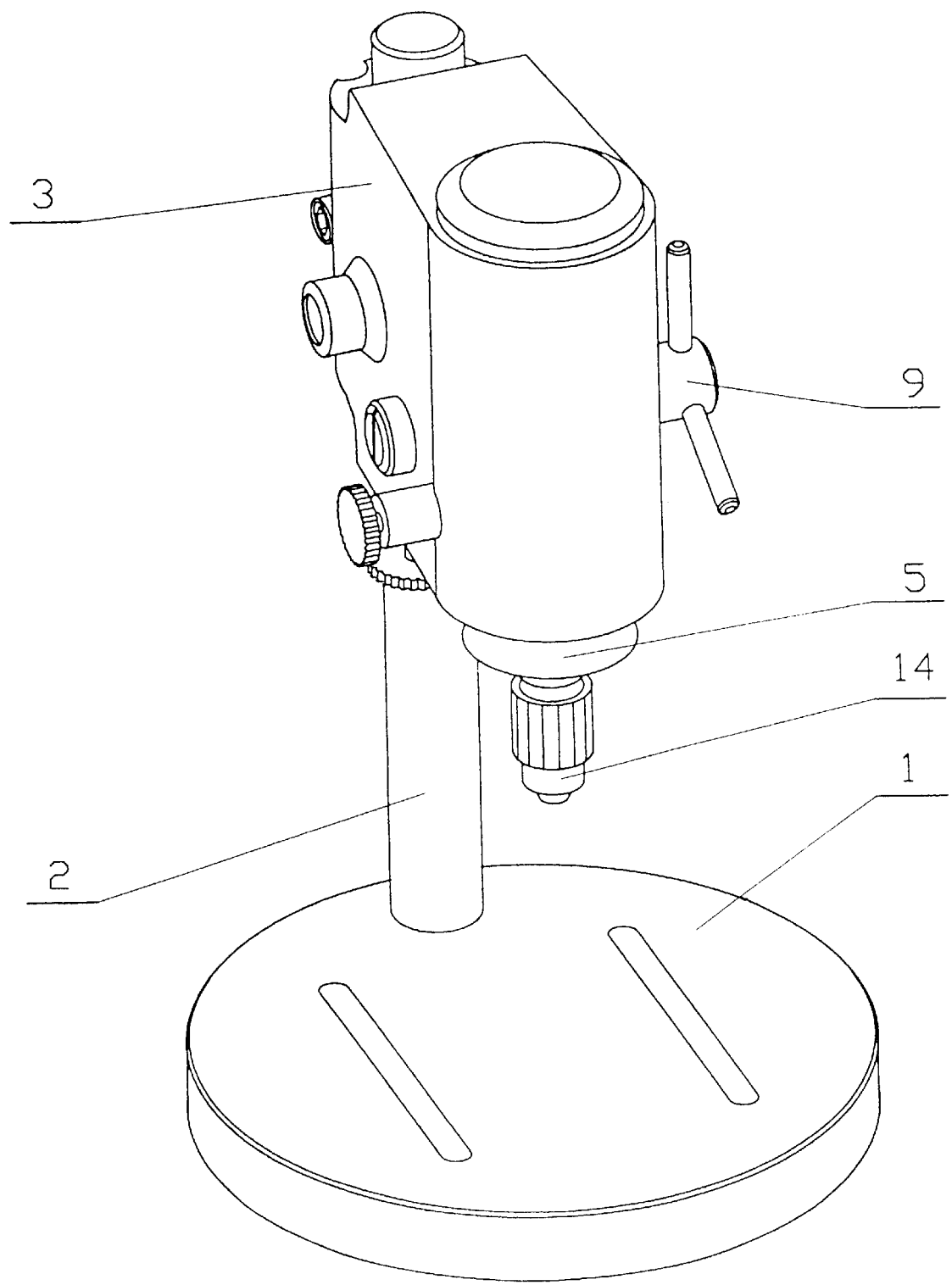
FIG. 1 shows schematically a table drill according to the invention.

FIG. 1 shows a table drill according to one preferred embodiment of the invention. Similar to those of the conventional, the table drill includes a base 1, a column 2 standing on the base 1, a composite body 3 arranged on the upper portion of the column 2 comprising a motor 4, a chuck 14 being capable of fixing a small bit and a controlling means 6 for moving the main-axis 5 upwards and downwards and adjusting automatically the pressure applied to a workpiece by the bit.

Figure 2:
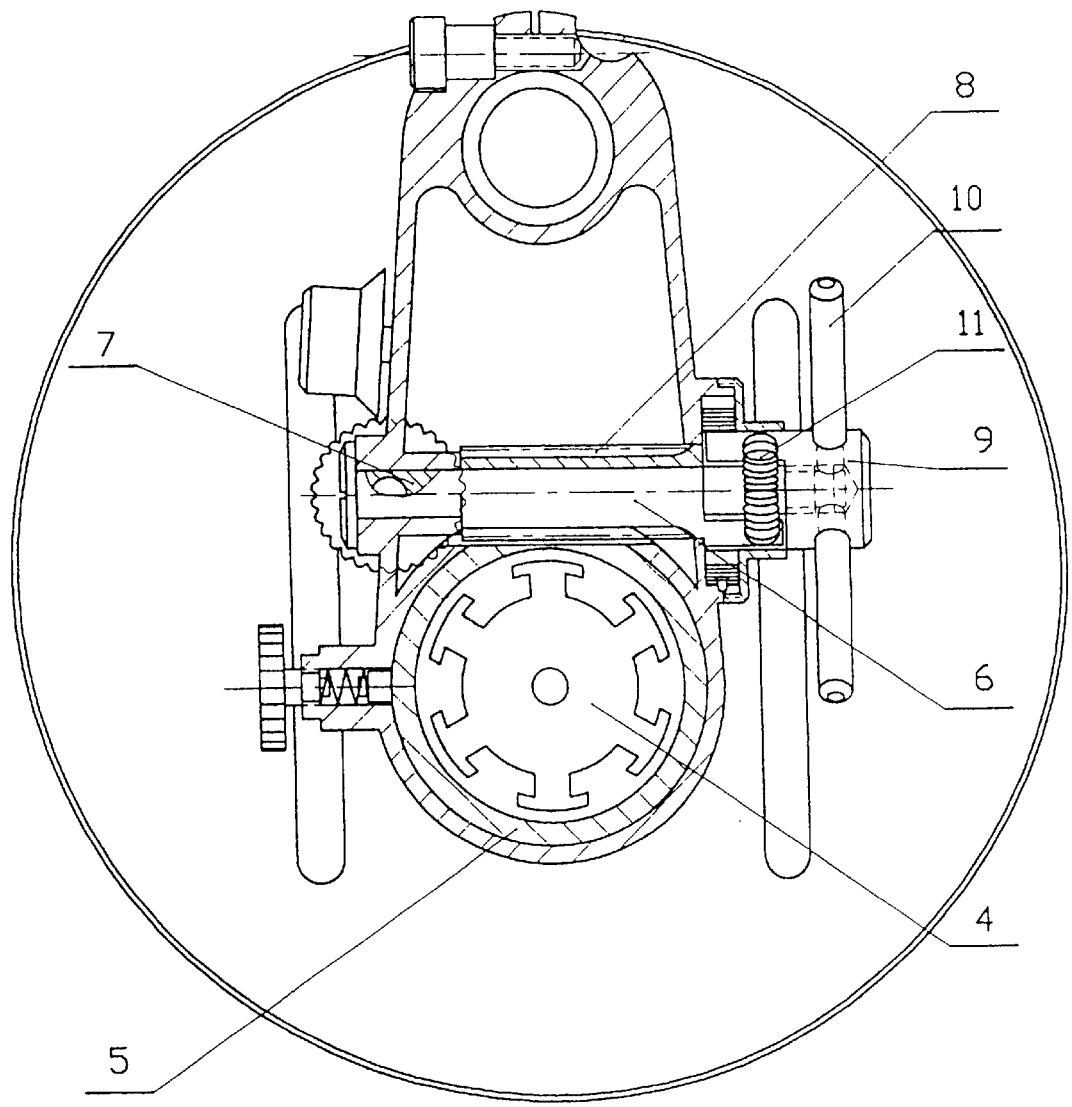
FIG. 2 is a top view of the chuck cross section of the table drill as shown in FIG. 1.
Figure 3:
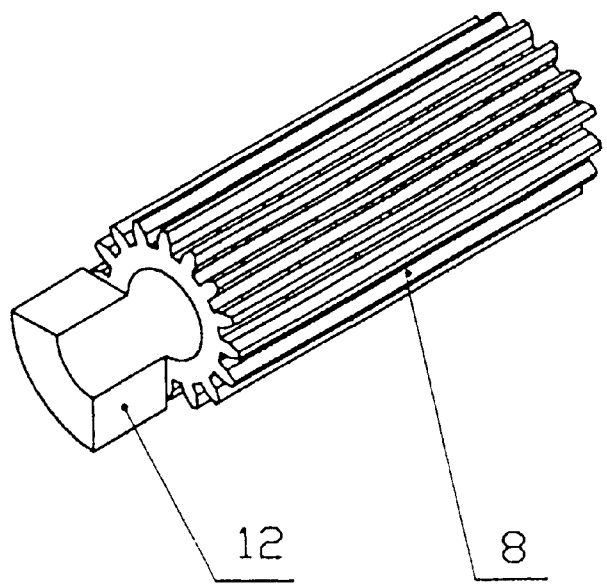
FIG. 3 shows schematically a gearbox according to the invention.
Figure 4:
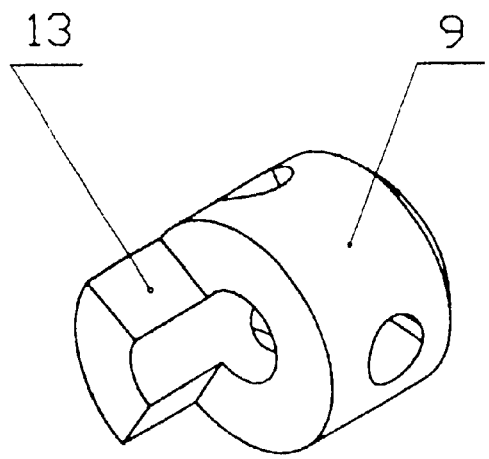
FIG. 4 shows schematically a linkage box according to the invention.

Referring to FIG. 2 as well as FIG. 3 and FIG. 4, the controlling means 6 comprises a gearbox 8 and a linkage box 9. The gearbox 8 jackets a horizontal axis 7 and one end of the gearbox 8 has a first block 12. The linkage box 9 is set at one end of the horizontal axis 7 and is provided with a second block 13 at one end of the linkage box 9 corresponding to the first block 12. A handle 10 is arranged on another end of the linkage box 9. A spring 11 is inserted between the blocks 12 and 13. By means of the buffering of the spring 11, the pressure applied to a workpiece by the bit may be automatically adjusted so as to prevent the bit from being broken when contacting the workpiece.

Figure 5:
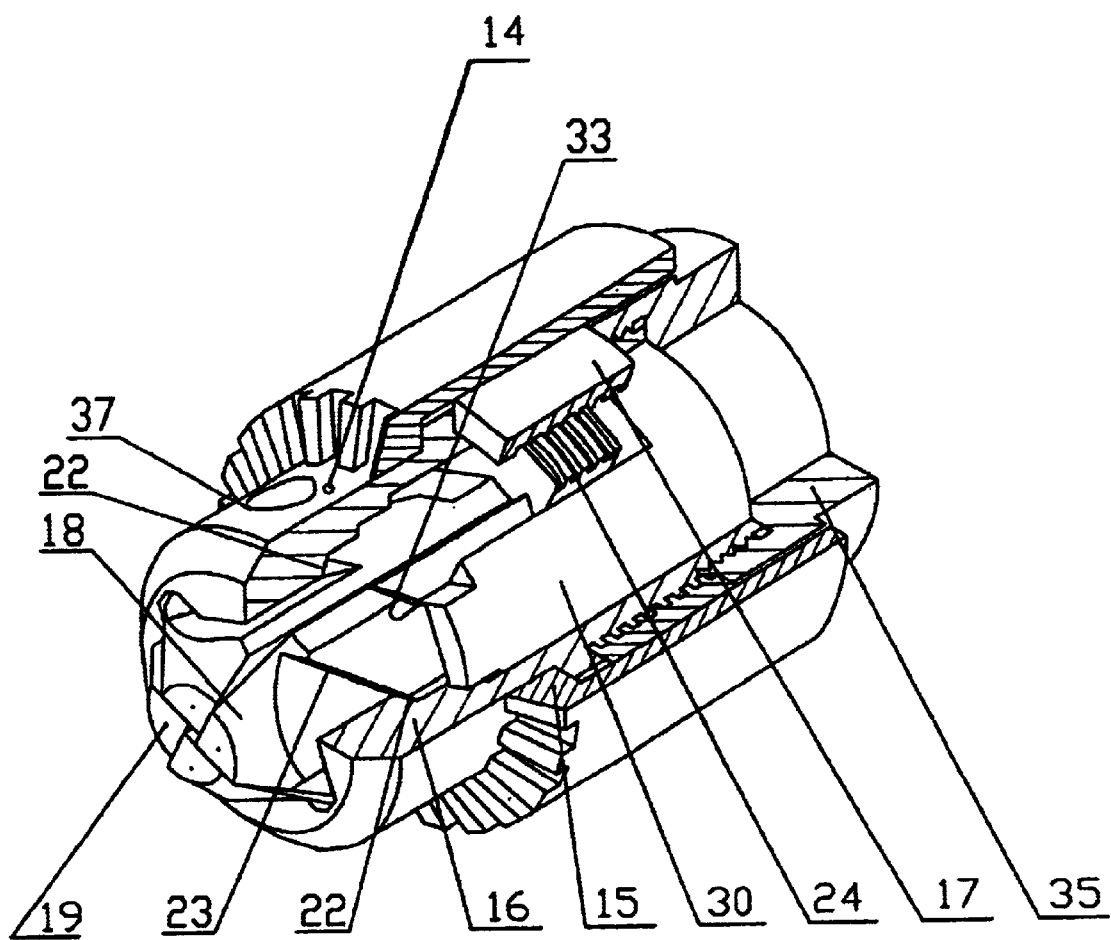
FIG. 5 schematically illustrates the structure of a chuck according to the invention.

FIG. 5 shows the structure of the chuck 14, comprising a bevel gear house 15, a jaw-position guiding body 16, a screw collar 17, a holding jaw 19 including four identical holders 18, a crossing linkage 24, a guiding jacket 30 and a positioning screw nut 35.

Figure 7:
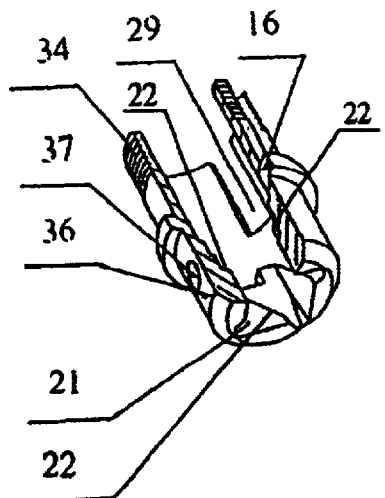
FIG. 7 schematically illustrates the structure of a jaw-position guiding body according to the invention.
Figure 10:
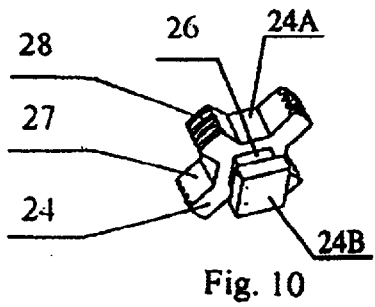
FIG. 10 schematically illustrates the structure of a crossing linkage according to the invention.
Figure 11:
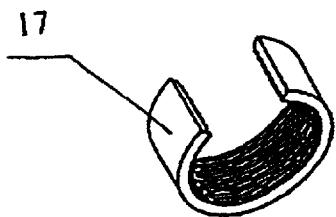
FIG. 11 schematically illustrates the structure of a screw collar according to the invention.
Figure 12:
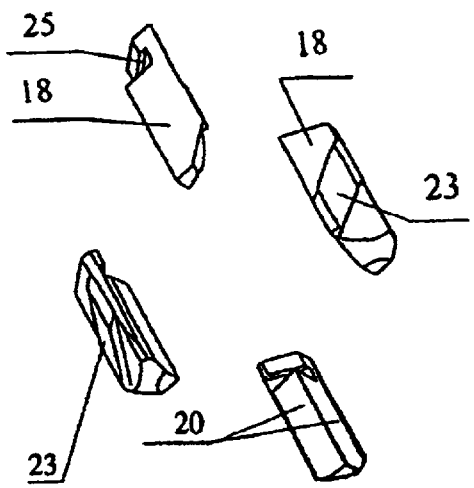
FIG. 12 schematically illustrates the structure of a holder according to the invention.

From FIG. 7, it is seen that the front portion of the jaw-position guiding body 16 is formed as a square hole and each inner wall 21 of the square hole has a guiding groove 22 that is slanted with respect to the longitudinal axis of the chuck. A plurality of screw threads 34 are formed on the outer surface of the rear portion of the jaw-position guiding body 16. The jaw-position guiding body 16 further forms four first guiding areas 29 for receiving the crossing linkage 24, as explained below. The holding jaw 19 including four holders 18 is arranged in the square hole. Referring to FIG. 12, each of the holders 18 is formed in shape of a substantially triangular bar having three faces defining a triangular cross section. One face of each of the holders 18 includes a slanted, raised guiding track 23. The other two faces of each holder 18 together define a notch 25. FIG. 10 shows schematically the crossing linkage 24, comprising a crossing head 24A, a projected portion 24B, and a groove 26 defined between the crossing head and the projected portion, all of which are formed integrally. Four equally spaced tips 27 radially extending from a portion of the crossing head are positioned in the same cylinder and are provided with outer screw threads 28. The four tips 27 engage with the first four guiding areas 29 of the jaw-position guiding body 16, respectively, and the outer screw threads 28 threadably engage the screw-collar 17 as shown in FIG. 11. A portion of the projected portion 24B formed on a portion of the crossing linkage 24 is received within the notch 25 of each holder 18.

Figure 8:
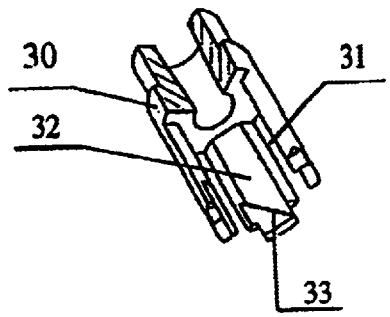
FIG. 8 schematically illustrates the structure of a guiding jacket according to the invention.

The guiding jacket 30 is inserted into the rear portion of the jaw-position guiding body 16. FIG. 8 shows the jacket 30, in which four second guiding areas 31 are formed at the front portion thereof so as to each receive one of the four tips 27 of the crossing head 24A and to circumferentially align with the four first guiding areas 29 of the jaw-position guiding body 16. The front portions of the inner wall of the jacket 30 that define each second guiding area 31 are each provided with a guiding groove 33 that is slanted with respect to the longitudinal axis of the chuck. Each guiding groove 33 cooperates with respective guiding grooves 22 disposed on the inner walls 21 of the jaw-position guiding body 16 to define a channel in which the raised guiding track 23 of each holder 18 can slide during adjustment of the chuck, as seen below. Thus, each guiding groove 33 form a composite guiding mechanism in combination with respective guiding grooves 22 for slidably receiving) an adjacent guiding track 23.

Figure 9:
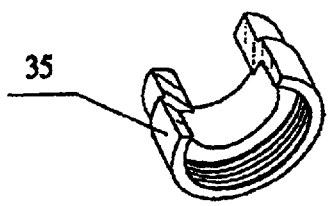
FIG. 9 schematically illustrates the structure of a positioning screw nut according to the invention.

As shown in FIG. 9 and FIG. 5, the rear end of the chuck 14 is provided with a positioning screw nut 35 that threadably engages with the outer screw threads 34 of the jaw-position guiding body 16, thereby securing engagement between the jacket 30.

Figure 6:
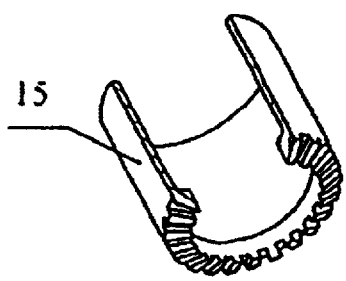
FIG. 6 schematically illustrates the structure of the bevel gear house according to the invention.

As shown in FIGS. 5, 6 and 7, an aperture 37 is formed on an appropriate portion of the jaw-position guiding body 16 for accommodating a lockpin (not shown) that matches with the bevel gear of a bevel gear housing 15. With a structure similar to a conventional bevel gear housing, the bevel gear housing 15 of the present invention jackets tightly the screw collar 17. When a bit is held or loosened, the lockpin can be inserted into the aperture 37 and the bevel gear house 15 can rotate the screw collar 17. The screw collar 17 threadably engages with the outer screw threads 28 formed on each tip 27 of the crossing head 24A so that the crossing linkage 24 can be movable axially along the guiding mechanism consisting of the jaw-position guiding body 16 and the post-positioning guiding jacket 30.

The four holders 18 comprising the holding jaw 19 are disposed together within the jaw-position guiding body 16 such that the raised guiding track 23 of each holder is slidably received within the respective channel defined by one guiding groove 22 and one guiding groove 33, which are both disposed adjacent the guiding track on the jaw-position guiding body 16 and the jacket 30, respectively. Additionally, the notch 25 of each holder 18 engages with the projected portion 24B of the crossing linkage 24, thereby tying extension of the holders 18 from the jaw-position guiding body 16 to the relative movement between the crossing linkage and the jaw-position guiding body, as explained below. Thus, the coupling of each holder 18 with the crossing linkage 24, together with guiding track and guiding groove structure discussed above, enables the holders 18 to extend in concert from a retracted position within the jaw-position guiding body 16 to an extended position, wherein each holder is partially disposed outside the jaw-position guiding body.

The extension and retraction of the holders 18 from the jaw-position guiding body 16 occurs as follows: a lockpin (not shown) having bevel gear teeth is inserted into the aperture 37, defined in the jaw-position guiding body, so as to engage the gear teeth of the bevel gear housing 15. The lockpin is then rotated, which causes the bevel gear housing 15 to rotate relative the jaw-position guiding body 16. Rotation of the bevel gear housing 15 causes the screw collar 17, which is fixedly attached to the bevel gear housing, to also rotate. Rotation of the screw collar 17 causes relative movement between the screw collar and the crossing linkage 24, which is threadably engaged with the screw collar via the screw threads 28 defined on the four crossing linkage tips 27. This relative movement causes the crossing linkage 24 to travel axially within the guiding jacket 30. Rotation of the bevel gear housing 15 in a first specified direction causes axial movement of the crossing linkage 24 toward the front end of the chuck, while rotation in the opposite direction causes axial movement toward the rear end of the chuck. Movement of the crossing linkage 24 toward the front end of the chuck correspondingly causes movement of the holders 18 in the same direction, owing to the connection of the projection portion 24B of the crossing linkage with each holder via the notch 25. This movement causes the holders 18 to progressively extend from the front end of the jaw-position guiding body 16 as the crossing linkage is axially moved. The holders 18 are each directionally guided in their extension by the engagement of their raised guiding tracks 23 with the channel formed by the respective guiding grooves 22 and 33. As seen in FIG. 5, the raised edges of the slanted guiding track 23 of each holder 18 engages the surfaces of the guiding grooves 22 and 33, which are also slanted, such that each holder converges toward a longitudinal center axis of the chuck as the holder extends. This movement enables the holders 18 to mutually converge in order to securely grab and hold a bit placed in the chuck. The above process is reversed to retract the holders 18 back into the jaw-position guiding body 16.

Thanking for the scientific and reasonable design, the structure of the present invention can overcome various defects existing in the prior art and be used for holding various cutters of drilling machines turning machines, milling machines, boring machines, or digitally controlled machines. It can hold not only those cutters having round handles in various sizes, but also those cutters having square handles. The table drill for drilling a millipore according to the invention can hold the small bit having a diameter equal to or less than 0.2 mm and can prevent the bit from being broken when contacting the workpiece. It can be widely used in various fields where precise process is needed.

I claim:

1. A. chuck for chucking a small bit comprising:
   a holding jaw comprising four holders;
   a jaw-position guiding body with a square hole at the front portion for positioning the holding jaw, the holding jaw being at least partially disposed within the square hole of the jaw-position guiding body;
   a crossing linkage for connecting the jaw-position guiding body to the holding jaw, the crossing linkage comprising a crossing head and a projection portion, the projection portion engaging with each holder of the holder jaw such that each holder moves within the jaw-position guiding body as the crossing linkage is moved relative to the jaw-position guiding body;
   a guiding jacket operably positioned with respect to both the crossing linkage and the jaw-position guiding body;
   a positioning screw nut threadably engaged with the jaw-position guiding body;
   a screw collar threadably engaged with the crossing linkage; and
   a bevel gear housing fixedly attached about the screw collar.

2. A chuck according to claim 1, wherein each of said holders comprises three faces that are arranged to define a triangular cross sectional shape, and wherein one face of each holder defines a raised guiding track, and wherein the other two faces of each holder together define a notch which engages with the projection portion.

3. A chuck according to claim 1, wherein a guiding groove is formed adjacent each of the four holders on an inner wall of the square hole of the jaw-position guiding body, and wherein an outer screw thread is formed on the outer surface at the rear portion of the jaw-position guiding body, and wherein four first axial guiding areas are formed at the rear portion of the jaw-position guiding body.

4. A chuck according to claim 3, wherein said crossing linkage further comprises four extended portions, each of the four extended portions being received into one of said four first axial guiding areas formed in the jaw-position guiding body.

5. A chuck according to claim 4, wherein said guiding jacket defines four second axial guiding areas, the guiding jacket being positioned within the jaw-position guiding body such that each second axial guiding area is aligned with one of the four first axial guiding areas, wherein one of the four extended portions of the crossing linkage is received into each of the second axial guiding areas, and wherein said guiding jacket further defines four guiding grooves on inner walls of the guiding jacket.

6. A table drill for drilling a millipore comprises:
   a base;
   a column standing on the base; and
   a composite body arranged on the column, comprising a motor, a chuck for chucking a small twist dill, a drilling spindle, and controlling means for controlling the drilling spindle to move upwards and downwards and automatically adjusting the pressure applied to the bit, wherein said controlling means comprises:
      a gearbox jacketing a horizontal axis of said controlling means, at one end of which a first block is formed;
      a linkage box comprising a second block at one end corresponding to the first block of the gearbox;
      a handle disposed on the other end of the linkage box; and
      a spring positioned between the first block and the second block.

7. A table drill according to claim 6, wherein the chuck comprises:
   a holding jaw comprising four holders;
   a jaw-position guiding body with a square hole at the front portion for positioning the holding jaw, the holding jaw being at least partially disposed within the square hole of the jaw-position guiding body;

a crossing linkage for connecting the jaw-position guiding body to the holding jaw, the crossing linkage comprising a crossing head and a projection portion, the projection portion engaging with each holder such that each holder of the holding jaw moves within the jaw-position guiding body as the crossing linkage is moved relative to the jaw-position guiding body;

a guiding jacket operably positioned with respect to both the crossing linkage and the jaw-position guiding body;

a positioning screw nut threadably engaged with the jaw-position guiding body;

a screw collar threadably engaged with the crossing linkage; and a bevel gear housing fixedly attached about the screw collar.

8. A table drill according to claim 7, wherein each of said holders comprises three faces that are arranged to define a triangular cross sectional shape, and wherein one face of each holder defines a raised guiding track, and wherein the other two faces of each holder together define a notch which engages with the projection portion.

9. A table drill according to claim 7, wherein a guiding groove is formed adjacent each of the four holders on an inner wall of the square hole of the jaw-position guiding body, and wherein an outer screw thread is formed on the outer surface at the rear portion of the jaw-position guiding body, and wherein four first axial guiding areas are formed at the rear portion of the jaw-position guiding body.

10. A table drill according to claim 9, wherein said crossing linkage further comprises four extended portions, each of the four extended portions being received into one of said four first axial guiding areas formed in the jaw-position guiding body.

11. A table drill according to claim 10, wherein said guiding jacket defines four second axial guiding areas, the guiding jacket being positioned within the jaw-position guiding body such that each second axial guiding area is aligned with one of the four first axial guiding areas, wherein one of the four extended portions of the crossing linkage is received into each of the second axial guiding areas, and wherein said guiding jacket further defines four guiding grooves on inner walls of the guiding jacket.

* * * * *